United States Patent
Timpanaro-Perrotta et al.

(10) Patent No.: US 7,533,137 B1
(45) Date of Patent: May 12, 2009

(54) SYSTEM AND METHOD FOR GROUPING FILES

(75) Inventors: Michael C. Timpanaro-Perrotta, Sunnyvale, CA (US); Scott D. Kaiser, Burlingame, CA (US)

(73) Assignee: Symantec Operating Corporation, Cupertino, CA (US)

( * ) Notice: Subject to any disclaimer, the term of this patent is extended or adjusted under 35 U.S.C. 154(b) by 490 days.

(21) Appl. No.: 10/231,903

(22) Filed: Aug. 30, 2002

(51) Int. Cl.
*G06F 12/00* (2006.01)
(52) U.S. Cl. ...................................... 707/205; 707/200
(58) Field of Classification Search ...................... 707/4, 707/6, 7, 10, 9, 200–206; 711/147
See application file for complete search history.

(56) References Cited

U.S. PATENT DOCUMENTS

| | | | | |
|---|---|---|---|---|
| 5,421,011 A | * | 5/1995 | Camillone et al. .......... 718/104 |
| 5,551,028 A | * | 8/1996 | Voll et al. ............... 707/103 R |
| 5,878,410 A | * | 3/1999 | Zbikowski et al. ............. 707/2 |
| 6,366,913 B1 | * | 4/2002 | Fitler et al. ..................... 707/9 |
| 6,571,261 B1 | * | 5/2003 | Wang-Knop et al. ........ 707/206 |
| 6,594,674 B1 | * | 7/2003 | Kaplan et al. ............ 707/104.1 |
| 6,601,067 B1 | * | 7/2003 | Hiyoshi ......................... 707/7 |
| 6,615,225 B1 | * | 9/2003 | Cannon et al. .............. 707/204 |
| 6,947,959 B1 | * | 9/2005 | Gill .......................... 715/501.1 |
| 7,120,684 B2 | * | 10/2006 | Lawing et al. .............. 709/203 |
| 2003/0050974 A1 | * | 3/2003 | Mani-Meitav et al. ...... 709/203 |
| 2004/0177319 A1 | * | 9/2004 | Horn ....................... 715/501.1 |

* cited by examiner

*Primary Examiner*—Uyen T. Le
(74) *Attorney, Agent, or Firm*—Campbell Stephenson LLP

(57) ABSTRACT

Systems, methods, apparatus and software can provide the capability of grouping related files together so as to optimize placement of the files on the physical media. Consequently, certain system operations (e.g., backup, defragmentation and the like) can be performed on the group of files, as opposed to a single file or the entire filesystem.

21 Claims, 5 Drawing Sheets

SYSTEM AND METHOD FOR GROUPING FILES

FIELD OF THE INVENTION

The present invention relates to the field of filesystem management and more particularly to a system and method for grouping files to allow data protection and maintenance tasks to be performed more easily and efficiently.

BACKGROUND OF THE INVENTION

As data management systems grow more complex and provide support for constantly-increasing numbers of users, issues such as performance, data integrity, work-load management, batch processing, efficiency and continuous availability need to be addressed. Many systems provide only limited mechanisms for maintaining data integrity, ownership, and filesystem management, and are often unable to prevent loss of data under certain conditions. The growing presence of distributed computing, distributed storage and the increased need for sharing large amounts of data across an enterprise, have complicated matters. A solution is therefore required to support the variety of applications intended to provide such functionality. Storage subsystems that meet the storage demands of such data management systems are an integral part of these solutions.

To address the need for such storage systems, developments in storage solutions have led to the increased utilization by enterprises of distributed solutions such as Storage Area Networks (SANs) to provide storage consolidation, reliability, availability, and flexibility. Specifically, factors driving these developments include the increase in the amount of on-line data, data protection requirements including efficient and reliable data back-up, and rapidly increasing storage densities.

Unfortunately, related files (or their constituent blocks) may end up being stored in a variety of locations on a storage subsystem (e.g., a hard disk), and may even be spread across the storage subsystems that make up a SAN. This scattering can complicate the maintenance of the stored information. Defragmentation, backup and other maintenance functions can prove challenging on large filesystems due to the typically large number of files stored therein. Accordingly, it is desirable to address these and related file maintenance issues.

SUMMARY OF THE INVENTION

It has been discovered that systems, methods, apparatus and software can provide the capability of grouping related files together so as to optimize placement of the files on the physical media. Consequently, certain system operations (e.g., backup, defragmentation and the like) can be performed on the group of files, as opposed to a single file or the entire filesystem.

According to one embodiment of the present invention, a filesystem is disclosed. The filesystem includes grouping information. The grouping information indicates a group membership of a file in the filesystem. The group membership indicates that the file belongs to a group within the filesystem.

According to another embodiment of the present invention, a method is disclosed. A group membership of a file in a filesystem is set. The group membership indicates that the file belongs to a group within the filesystem.

According to another embodiment of the present invention, an apparatus is disclosed. The apparatus includes a filesystem means for setting a group membership of a file in a filesystem. The group membership indicates that the file belongs to a group within the filesystem.

The foregoing is a summary and thus contains, by necessity, simplifications, generalizations and omissions of detail. Consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention and advantages thereof may be acquired by referring to the following description and the accompanying drawings, in which like reference numbers indicate like features.

DETAILED DESCRIPTION

The following sets forth a detailed description of at least the best contemplated mode for carrying out the one or more devices and/or processes described herein. The description is intended to be illustrative and should not be taken to be limiting.

Introduction

A system and method according to the present invention groups files (typically, relatively smaller files, due to their typically proportionally greater numbers), for example, linearly on a given storage unit (e.g., a hard disk), in order to improve the performance of storage maintenance operations. This can be accomplished by such systems' users in a number of ways, including the placing of such files in one or more directories designated for such purposes, by executing software or command line commands that designate the desired files as being in a given group, or by some other comparable method. In this way, the user is able to perform operations (backup, defragmentation and the like) on the group of files, as opposed to a single file or the entire filesystem. In fact, such targeted operations can be performed without user interaction. For example, this allows a filesystem backup or defragmentation to be performed in stages, each group of files being backed-up or defragmented one after another, rather than the entire filesystem at once. Moreover, such organization provides enhanced performance. It will be noted that grouping information that identifies which files are members of a group can be maintained in a variety of structures, several of which are now discussed, as well as the advantages provided thereby.

Example File Grouping Mechanisms

Figure 1:
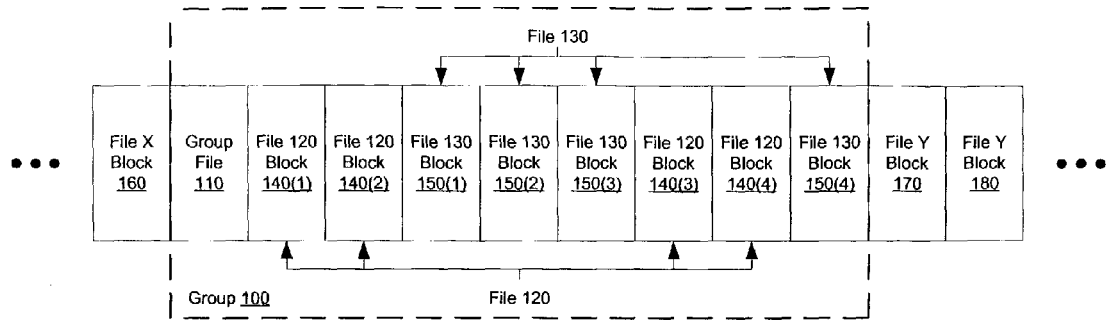
FIG. 1 is a block diagram illustrating the storage of files in a filesystem according to embodiments of the present invention.

FIG. 1 is a block diagram illustrating the storage of files in a filesystem according to embodiments of the present invention. A group 100 is defined by a group file 110, which appears in FIG. 1 at the beginning of the extents which make up group 100. An extent is defined as one or more adjacent blocks of data within the file system. An extent can be presented, for example, as an address-length pair, which identifies the starting block address and the length of the extent (in file system or logical blocks). As illustrated in FIG. 1, group 100 includes two files, a file 120 and a file 130. File 120 includes a number of blocks, depicted in FIG. 1 as file blocks 140(1)-(4). In a similar fashion, file 130 is depicted as including file blocks 150(1)-(4). Group file 110 includes information regarding these blocks. As will be apparent to one of skill in the art, the file blocks which make up group 100 are among a number of such file blocks that exist in the filesystem. Thus, blocks from other files will be stored near too or contiguously with group 100, which is illustrated in FIG. 1 by file X Block 160 and file Y Blocks 170 and 180.

As can be seen in FIG. 1, the files (and so blocks) that make up group 100 are logically contiguous (if interspersed with one another, and, potentially, with unused blocks (not shown)) and so, using methods and systems of the present invention, can be physically co-located (e.g., located within a given storage area (whether on a single storage subsystem (e.g., a hard disk) or spread among a number of such storage subsystems), typically in a linear fashion, and can even be made physically contiguous, although, strictly speaking this is not an absolute requirement (e.g., in the case of fragmentation, unused blocks will likely be interspersed throughout a given group). Typically, this co-location will be handled by the filesystem software and/or volume management software. Of course, given today's storage arrays, there is a possibility that a group's files may ultimately be stored on multiple storage subsystems. However, the group's files can be stored on a single track, or multiple contiguous tracks, of a storage subsystem (e.g., a hard disk) to further localize the group's storage, and so potentially enhance the advantages provided thereby. The consolidation provided by embodiments of the present invention in turn provides a variety of advantages.

A filesystem according to the present invention can improve system performance when defragmenting the filesystem. Free resources are initially aligned and allocated to files in the most efficient order possible to provide optimal performance. On an active file system, the original order of free resources is lost over time as files are created, removed, and resized. The file system is spread further and further along the disk, leaving unused gaps or fragments between areas that are in use. This process is also known as fragmentation and leads to degraded performance because the file system has fewer options when assigning a file to an extent (a group of contiguous data blocks, as noted previously). Thus, the ability to quickly and efficiently defragment a filesystem is an important aspect of filesystem maintenance, especially as the size of the filesystem grows.

By allowing a user (or system administrator) to divide a filesystem into groups, the need to defragment the entire filesystem in one operation is avoided. Instead, the defragmentation process is made more manageable, e.g., requiring fewer CPU and I/O resources, and potentially faster, at least because the storage being defragmented is smaller. As will be apparent to one of skill in the art, this ability to divide defragmentation into smaller steps is especially advantageous when the filesystem is large and/or contains large numbers of relatively small files.

Moreover, such filesystems will naturally require less defragmentation, as their files will tend to become less fragmented than would otherwise occur, as a result of their storage being limited to their group's physical storage space. Thus, the blocks for a given file will only appear in its group's storage area, and will not potentially be spread over the entire physical storage space. Not only is there less to be defragmented, there are fewer places to which a file's blocks may be dispersed.

In a similar fashion, the backup of such filesystems is also simplified and made more efficient by embodiments of the present invention. As with defragmentation, the ability to divide a filesystem (and, again, especially a large filesystem or one with a large number of files) into smaller, more manageable pieces simplifies the process of copying files for purposes of backing-up files stored therein (and, in fact, for any purpose). Furthermore, because the files of a given group are co-located, such backups can be performed more efficiently as a result of the advantage taken by the present invention with regard to read-ahead algorithms, which is now described.

Another advantage of a filesystem employing embodiments of the present invention is the performance improvement provided thereby. Today's filesystems, storage subsystems (e.g., hard disks) and, increasingly, storage arrays, employ read-ahead algorithms to improve the performance of read operations in such systems. A filesystem according to the present invention complements such techniques by allowing the grouping of files (e.g., by a user with knowledge of files' relatedness). This results in such a filesystem having the ability to request related files as a group with the knowledge that, because of their physical proximity to one another, the files will be quickly and efficiently read using the read-ahead algorithm employed thereby, and, potentially, by the storage hardware as well. Typically, such groupings will limit a group to a single storage subsystem (e.g., a hard disk) to ensure that such capabilities are available and used, although this is not mandated, and, in fact, may not be preferable (e.g., if the situation demands that a group span a number of storage subsystems due to the size of its constituent files).

In fact, access performance can be further improved by organizing the files within groups by including ordering information. For example, files can be ordered such that files that are accessed often are "earlier" in the group's files (based, for example, on the logical position of the file in the group's group information (e.g., group file) or physical position). Another example is to locate smaller files before larger files in the order of access, so that smaller files are read quickly and completely (and so available for processing or other uses), with the extended time required to access larger files relegated to later in the reading of the group's files. This allows, for example, an application made up of a number of files to launch more quickly than would otherwise be possible.

These advantages are not limited only to filesystems that address files in a block-centric manner. As noted, disk space is typically allocated in the form of logical blocks (e.g., 512-byte sectors, which make up the logical blocks, although a filesystem may support other logical block sizes (e.g., 1024, 2048, 4096, and 8192 bytes)). However, embodiments of the present invention can be designed to employ extent-based allocation. Extent-based allocation allows multiple blocks to be treated as a single unit of storage. In a filesystem according to the present invention, storage can be allocated in groups of extents rather than a block at a time (as seen in other filesystems (e.g., the UNIX filesystem).

Extents allow disk input/output (I/O) to take place in units of multiple blocks if storage is allocated in consecutive blocks, as they can be using embodiments of the present invention. For sequential I/O, multiple block operations are considerably faster than block-at-a-time operations; almost all disk drives accept I/O operations of multiple blocks. Thus, as an extension of this concept, files that are grouped together further speed such operations. In one embodiment, inodes are used to store metadata and/or data. In a typical example, an inode is a data structure that contains information about a file. Inodes can include such information as: file length, link count, owner and group IDs, access privileges, time of last access, time of last modification, and pointers to extents that contain a file's data. Extent allocation only slightly alters the interpretation of addressed blocks from the inode structure compared to block-based inodes. Certain inode structures contain a small number of addresses for directly-addressed blocks, as well as an indirect block and a double-indirect block. An indirect block contains the addresses of other blocks. Similarly, a double-indirect block contains the address of a block that also contains an address, and so the location of the block being addressed. This concept can be extended to the use of extents, where an inode is constructed that includes references to direct extents, each of which are pairs of starting block addresses and lengths in blocks, as well as indirect address extents, which contain the addresses of other extents. These indirect address extents can be used for single- and double-indirection:

One indirect address extent can be used for single indirection (each entry in the extent indicates the starting block number of an indirect data extent); and Another indirect address extent can be used for double indirection (each entry in the extent indicates the starting block number of a single indirect address extent).

All indirect data extents for a file should be the same size; this size is typically set when the first indirect data extent is allocated and stored in the inode. Directory inodes typically use a standard indirect data extent size. By default, regular file modes also use a standard indirect data extent size that can be altered, for example, using a dedicated system parameter. These inodes allocate the indirect data extents in clusters to simulate larger extents.

Extents thus allow a layer of abstraction to be introduced between the file groups and the blocks that make up those files. However, in the manner that the present invention groups a file's blocks, so too can a file's extents (or even some combination thereof) be grouped, thereby providing the aforementioned advantages.

Figure 2A:
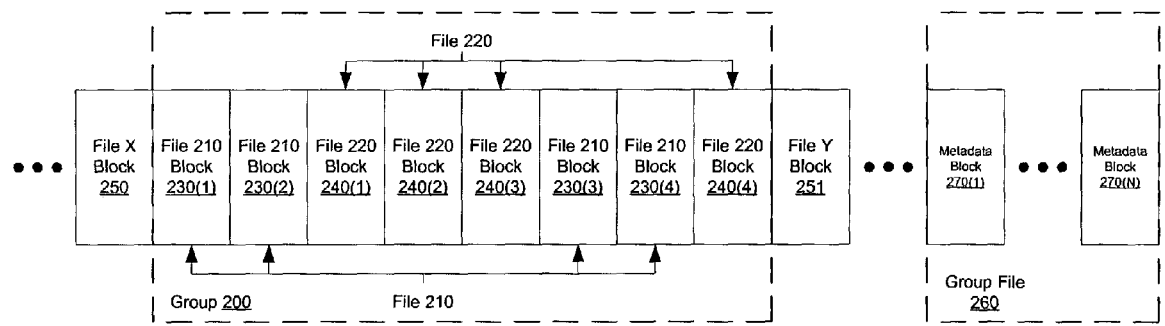
FIG. 2A illustrates the grouping of files according to another embodiment of the present invention.
Figure 2B:
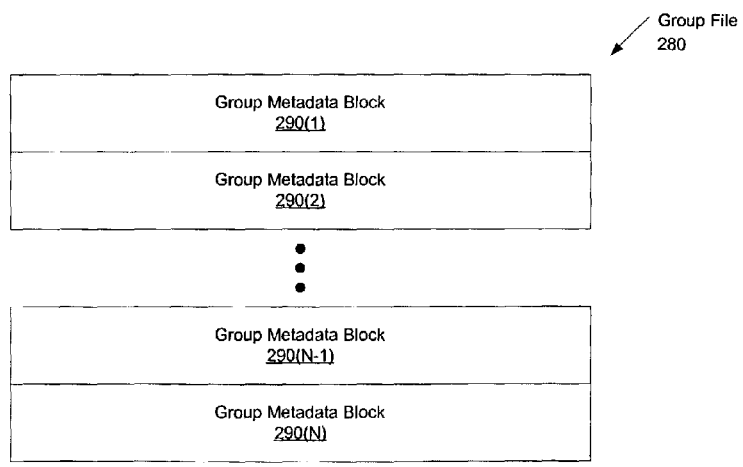
FIG. 2B illustrates a group file according to an embodiment of the present invention.

FIG. 2A illustrates the grouping of files according to another embodiment of the present invention. FIG. 2A includes a group 200 that contains the file blocks for two files, a file 210 and a file 220. File 210 includes file blocks 230(1)-(4). Similarly, file 220 includes file blocks 240(1)-(4). As before, the file blocks of group 200 are among other such file blocks stored on one or more storage devices, as represented in FIG. 2A by a file X Block 250 and a file Y Block 251. Also stored is a group file 260, which contains metadata blocks that contain information defining each group (depicted in FIG. 2A by metadata blocks 270(1)-(N)). FIG. 2B illustrates a group file such as group file 260 and the metadata blocks that make up that group file (illustrated in FIG. 2B as a group file 280). Group file 280 includes a number of metadata blocks (illustrated in FIG. 2B as group metadata blocks 290(1)-(N)). The aforementioned metadata can include, for example, group location information, the location of free space generally, and the location of free space near each group.

It will be noted that the variable identifier "N" is used in FIG. 2 to more simply designate the final element (e.g., metadata blocks 270(1)-(N)) of a series of related or similar elements (e.g., metadata blocks). The repeated use of such variable identifiers is not meant to imply a correlation between the sizes of such series of elements, although such correlation may exist. The use of such variable identifiers does not require that each series of elements has the same number of elements as another series delimited by the same variable identifier. Rather, in each instance of use, the variable identified by "N" may hold the same or a different value than other instances of the same variable identifier.

Figure 3:
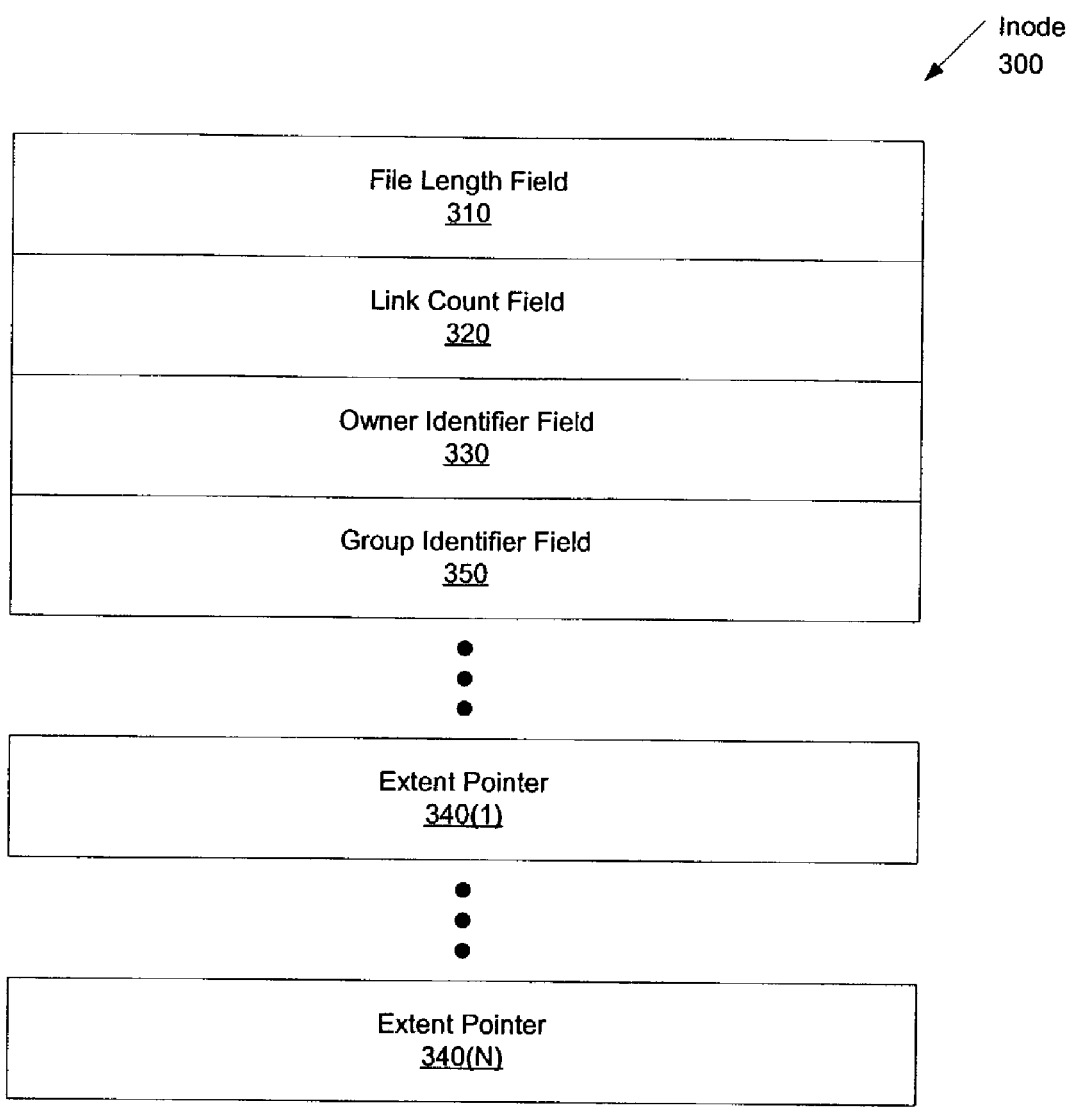
FIG. 3 is a block diagram illustrating yet another embodiment of the present invention.

FIG. 3 is a block diagram illustrating yet another embodiment of the present invention. FIG. 3, an inode 300 is shown. Inode 300 includes a variety of information regarding a file. Generally, inodes are common components of various filesystems, such as UNIX. Inode 300 includes a file link length field 310, link count filed 320, and owner identifier field 330 and extent pointers 340(1)-(N), among other possible such fields. In order that the file designated by inode 300 port with embodiments of the present invention, inode 300 also includes a group identifier field 350. Group identifier field 350 contains information that allows the filesystem to identify the blocks and/or extents that make up the file as being included in the group identified by a group identifier field 350.

Embodiments of the present invention allow for the grouping of files regardless of their location in the user-visible file space. This is a valuable feature, as the user is not restricted as to which files, regardless of their location (either their logical or physical location). This allows files to be organized in a logical, intuitive fashion, yet allows the user to enjoy the advantages of the present invention.

It should be noted that, in fact, the construction illustrated in FIG. 3 is not mutually exclusive with those of FIG. 1 or 2A/2B, and so can be used therewith. In fact, the approaches depicted in FIGS. 2A/2B and 3 can be combined to provide the ability to access multiple files in a group by knowing only a single file belonging to the group. In this way, an entire group need not be co-located, as information regarding access to other of the group's files will be available in the group's group table. Such a scenario is discussed in connection with FIG. 6.

Figure 4:
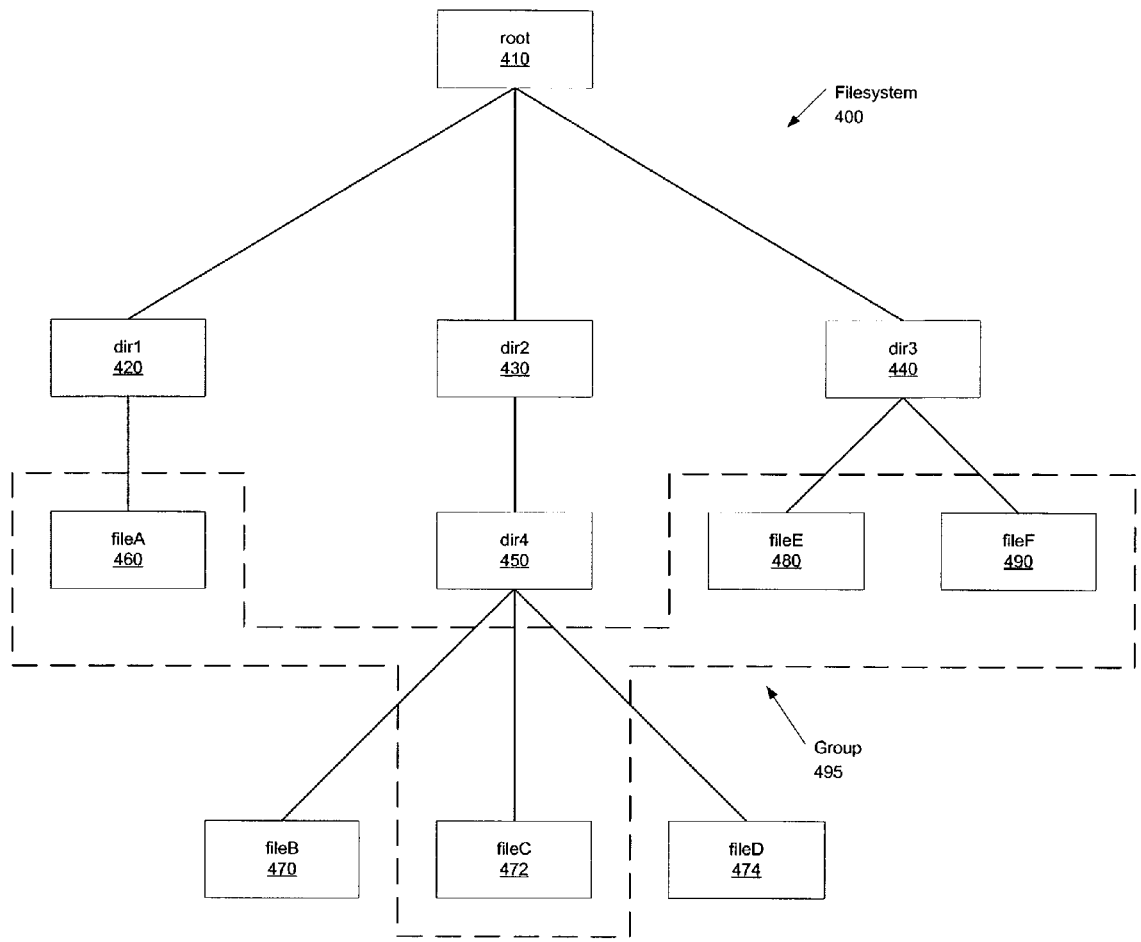
FIG. 4 is a block diagram illustrating a filesystem according to an embodiment of the present invention.

FIG. 4 is a block diagram illustrating a filesystem 400 in which various files are located in various directories, yet are still able to be grouped using embodiments of the present invention. Filesystem 400 includes a root directory 410 each, in turn, includes a variety of subdirectories (illustrated in FIG. 4 as directories dir1 420, dir2 430, dir3 440, and dir4 450). Located in these directories are a number of files (illustrated in FIG. 4 by files fileA 460, fileB 470, fileC 472, fileD 474, fileE 480 and fileF 490). As can be seen, fileA 460 is located in dir1 420, while fileB 470, fileC 472, and fileD 474 are located in dir4 450, and fileE 480 and fileF 490 are located in dir3 440. Also illustrated in FIG. 4 is a group 495, which includes fileA 460, fileC 472, fileE 480 and fileF 490.

Figure 5:
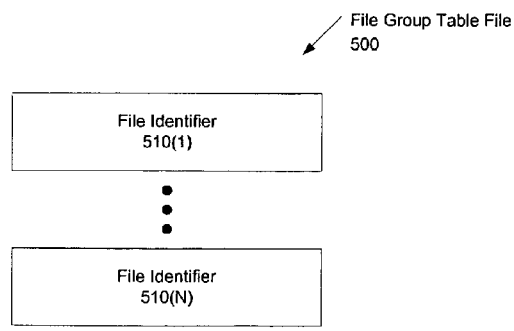
FIG. 5 is a block diagram illustrating a file group table file according to an embodiment of the present invention.

FIG. 5 is a block diagram illustrating the file group table file 500 which includes information regarding each of the files in the given group (with respect to FIG. 4, group 495). File group file 500 includes file identifiers 510(1)-(N), which identify each of the files (here, fileA 460, fileC 472, fileE 480 and fileF 490) which belong to the given group (here, group 495). File identifiers 510(1)-(N) can each contain information regarding an inode of a file in the given group. Alternatively, each of file identifiers 510(1)-(N) may contain the inodes of all files in a given group, thereby representing one group each in the manner of group file 280 of FIG. 2B.

Thus, as is depicted in FIGS. 4 and 5, files can be physically co-located, while logically spread across the namespace of the given filesystem. This allows files to be located in a logically intuitive manner, while still being part of the same group. Alternatively, it may be more intuitive to maintain a grouping in which all files in the group are stored in a single directory (or a set of directories), to make the grouping more evident to the users of such a filesystem. For example, to give users some measure of control over backup or defragmentation operations, users could be informed that the files stored in directories (or certain directories) will be grouped together and backed-up or defragmented as a group.

In fact, while restricting a file to membership in only one group is simpler (and so more easily implemented), a filesystem according to embodiments of the present invention can be designed to allow a file to belong to multiple groups. In the latter case, a file can be allowed membership in a number of groups, for example, to parallel the fact that, conceptually, its information belongs to more than one group of files. Examples include a file that is shared between a number of web pages and a file that represents a part or sub-assembly that is shared by a number of products (e.g., a part or sub-assembly in a computer-aided design (CAD) environment).

An Example of Accessing Grouped Files

Figure 6:
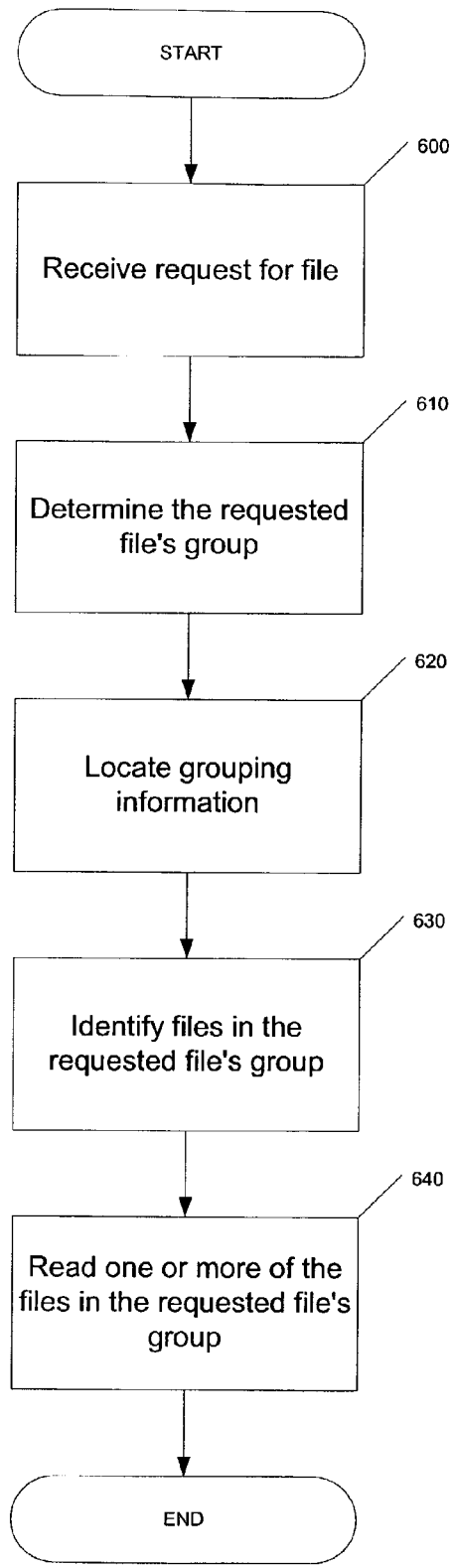
FIG. 6 is a flow diagram illustrating an example process of reading a file in a filesystem according to the present invention.

FIG. 6 is a flow diagram illustrating an example process of reading a file in a filesystem according to the present invention, for the purpose of using the file, defragmenting the file (and so, the filesystem), backing-up the file or for some other purpose. FIG. 6 is discussed in terms of the embodiment shown in FIGS. 2A and 2B (in which the grouping information is kept in a group file such as group file 280) in combination with that of FIG. 3 (in which a file's group information is (also) available in its inode). The process begins with the filesystem's receipt of a request for the file (step 600). Once this request is received, a determination is made as to the group to which the file belongs (step 610).

The filesystem (aware that the file belongs to a group), and the operating system software controlling the filesystem then investigate the group to which the file belongs. Grouping information is then located by locating the group file (step 620). Once this information has been located, the requested file's group is identified (step 630). Having this information available, it is then possible to read all (or a portion of) the files that have been grouped with the requested file (step 640).

As noted, FIG. 6 depicts a flow diagram illustrating a process according to one embodiment of the present invention. It is appreciated that operations discussed herein may consist of directly entered commands by a computer system user or by steps executed by application specific hardware modules, but the preferred embodiment includes steps executed by software modules. The functionality of steps referred to herein may correspond to the functionality of modules or portions of modules.

The operations referred to herein may be modules or portions of modules (e.g., software, firmware or hardware modules). For example, although the described embodiment includes software modules and/or includes manually entered user commands, the various example modules may be application specific hardware modules. The software modules discussed herein may include script, batch or other executable files, or combinations and/or portions of such files. The software modules may include a computer program or subroutines thereof encoded on computer-readable media.

Additionally, those skilled in the art will recognize that the boundaries between modules are merely illustrative and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, those skilled in the art will recognize that the operations described in example embodiment are for illustration only. Operations may be combined or the functionality of the operations may be distributed in additional operations in accordance with the invention.

Alternatively, such actions may be embodied in the structure of circuitry that implements such functionality, such as the micro-code of a complex instruction set computer (CISC), firmware programmed into programmable (e.g., PROM) or erasable/programmable devices (e.g., EPROM), the configuration of a field-programmable gate array (FPGA), the design of a gate array or full-custom application-specific integrated circuit (ASIC), or the like.

Each of the blocks of the flow diagram may be executed by a module (e.g., a software module) or a portion of a module or a computer system user using, for example, a computer system such as that described below. Thus, the above described method, the operations thereof and modules therefor may be executed on a computer system configured to execute the operations of the method and/or may be executed from computer-readable media. The method may be embodied in a machine-readable and/or computer-readable medium for configuring a computer system to execute the method. Thus, the software modules may be stored within and/or transmitted to a computer system memory to configure the computer system to perform the functions of the module.

The software modules described herein may be received by such a computer system, for example, from computer readable media. The computer readable media may be permanently, removably or remotely coupled to the computer system. The computer readable media may non-exclusively include, for example, any number of the following: magnetic storage media including disk and tape storage media. optical storage media such as compact disk media (e.g., CD-ROM, CD-R, etc.) and digital video disk storage media. nonvolatile memory storage memory including semiconductor-based memory units such as FLASH memory, EEPROM, EPROM, ROM or application specific integrated circuits. volatile storage media including registers, buffers or caches, main memory, RAM, and the like. and data transmission media including computer network, point-to-point telecommunication, and carrier wave transmission media. In a UNIX-based embodiment, the software modules may be embodied in a file which may be a device, a terminal, a local or remote file, a socket, a network connection, a signal, or other expedient of communication or state change. Other new and various types of computer-readable media may be used to store and/or transmit the software modules discussed herein. Such software modules can be executed, for example, on a computer such as that discussed below.

Figure 7:
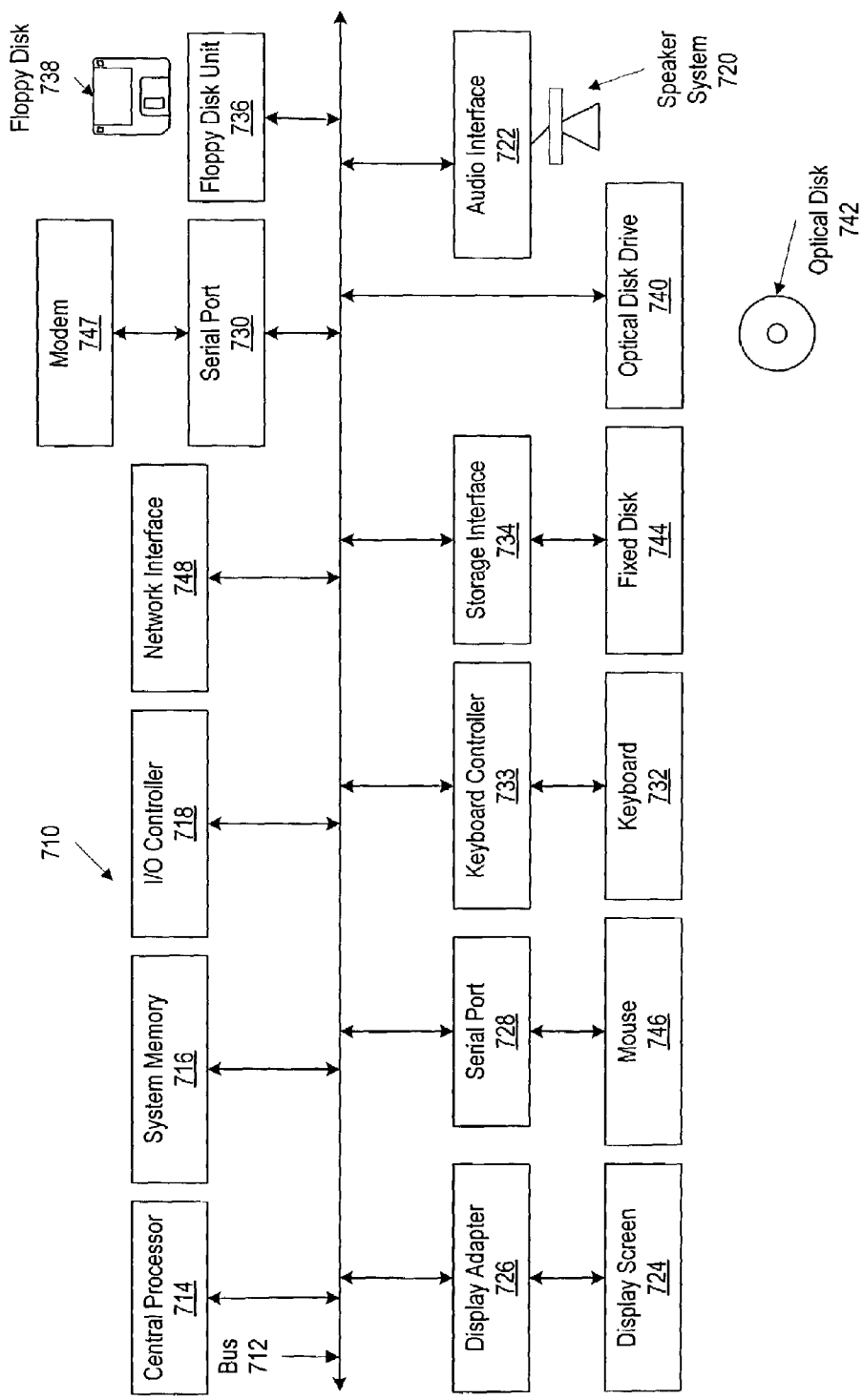
FIG. 7 is a block diagram of a computer system capable of implementing embodiments of the present invention.

An Example Computer System Capable of Supporting a Filesystem of the Present Invention FIG. 7 depicts a block diagram of a computer system 710 suitable for implementing the present invention, and example of one or more of client computers 120(1)-(N). Computer system 710 includes a bus 712 which interconnects major subsystems of computer system 710 such as a central processor 714, a system memory 716 (typically RAM, but which may also include ROM, flash RAM, or the like), an input/output controller 718, an external audio device such as a speaker system 720 via an audio output interface 722, an external device such as a display screen 724 via display adapter 726, serial ports 728 and 730, a keyboard 732 (interfaced with a keyboard controller 733), a storage interface 734, a floppy disk drive 736 operative to receive a floppy disk 738, and a CD-ROM drive 740 operative to receive a CD-ROM 742. Also included are a mouse 746 (or other point-and-click device, coupled to bus 712 via serial port 728), a modem 747 (coupled to bus 712 via serial port 730) and a network interface 748 (coupled to bus 712).

Bus 712 allows data communication between central processor 714 and system memory 716, which may include both read only memory (ROM) or flash memory (neither shown), and random access memory (RAM) (not shown), as previously noted. The RAM is generally the main memory into which the operating system and application programs are loaded and typically affords at least 16 megabytes of memory space. The ROM or flash memory may contain, among other code, the Basic Input-Output system (BIOS) which controls basic hardware operation such as the interaction with peripheral components. Applications resident with computer system 710 are generally stored on and accessed via a computer readable medium, such as a hard disk drive (e.g., fixed disk 744), an optical drive (e.g., CD-ROM drive 740), floppy disk unit 736 or other storage medium. Additionally, applications may be in the form of electronic signals modulated in accordance with the application and data communication technology when accessed via network modem 747 or interface 748.

Storage interface 734, as with the other storage interfaces of computer system 710, may connect to a standard computer readable medium for storage and/or retrieval of information, such as a fixed disk drive 744. Fixed disk drive 744 may be a part of computer system 710 or may be separate and accessed through other interface systems. Many other devices can be connected such as a mouse 746 connected to bus 712 via serial port 728, a modem 747 connected to bus 712 via serial port 730 and a network interface 748 connected directly to bus 712. Modem 747 may provide a direct connection to a remote server via a telephone link or to the Internet via an internet service provider (ISP). Network interface 748 may be used to directly connect to a remote server via the Internet through the use of a POP (point of presence).

Many other devices or subsystems (not shown) may be connected in a similar manner (e.g., bar code readers, document scanners, digital cameras and so on). Conversely, it is not necessary for all of the devices shown in FIG. 7 to be present to practice the present invention. The devices and subsystems may be interconnected in different ways from that shown in FIG. 7. The operation of a computer system such as that shown in FIG. 7 is readily known in the art and is not discussed in detail in this application. Code to implement the present invention may be stored in computer-readable storage media such as one or more of system memory 716, fixed disk 744, CD-ROM 742, or floppy disk 738. Additionally, computer system 710 may be any kind of computing device, and so includes personal data assistants (PDAs), network appliance, X-window terminal or other such computing device. The operating system provided on computer system 710 may be MS-DOS®, MS-WINDOWS®, OS/2®, UNIX®, Linux® or other known operating system.

Regarding the signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing described embodiment wherein the different components are contained within different other components (e.g., the various elements shown as components of computer system 700). It is to be understood that such depicted architectures are merely examples, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

What is claimed is:

1. A method comprising:
   identifying a first computer system file and a second computer system file, wherein the first computer system file comprises a first plurality of file blocks, the second computer system file comprises a second plurality of file blocks, the first and second computer system files are functionally related, and the first and second computer system files are non-contiguously located on a storage device;
   reading the first and second plurality of file blocks;
   storing the first and second plurality of file blocks contiguously in at least one of the storage device and a second storage device;
   storing group membership information for the first and second computer system files in at least one of a group file and an inode; and
   performing a storage maintenance operation on only file blocks included in files identified by the group membership information, subsequent to the storing the first and second plurality of file blocks contiguously.

2. The method of claim 1 wherein the identifying further comprises at least one of:
   placing the first and second computer system files in a directory; and executing a command designating the first and second computer system files as belonging to a group.

3. The method of claim 1 wherein the storing the first and second plurality of file blocks contiguously further comprises:
storing all of the second plurality of file blocks after the first plurality of file blocks in a sequence on the at least one of the storage device and a second storage device.

4. The method of claim 1 wherein the storing the first and second plurality of file blocks contiguously further comprises:
interleaving the first and second plurality of file blocks in a sequence on the at least one of the storage device and a second storage device.

5. The method of claim 1 wherein the storing group membership information further comprises:
storing group membership information for the first and second computer system files in a group file contiguously located with the contiguously stored first and second plurality of file blocks.

6. The method of claim 1 wherein the storing group membership information further comprises:
storing group membership information for the first and second computer system files in a group file non-contiguously located with the contiguously stored first and second plurality of file blocks.

7. The method of claim 1 wherein the storing group membership information further comprises:
storing first group membership information in a first inode corresponding to the first computer system file; and
storing second group membership information in a second inode corresponding to the second computer system file.

8. The method of claim 1 wherein the first and second computer system files appear to a user as being in different locations in a computer filesystem.

9. A computer readable storage medium comprising program instructions executable on a processor, the program instructions are operable to implement each of:
identifying a first computer system file and a second computer system file, wherein the first computer system file comprises a first plurality of file blocks, the second computer system file comprises a second plurality of file blocks, the first and second computer system files are functionally related, and the first and second computer system files are non-contiguously located on a storage device;
reading the first and second plurality of file blocks;
storing the first and second plurality of file blocks contiguously in at least one of the storage device and a second storage device;
storing group membership information for the first and second computer system files in at least one of a group file and an inode; and
performing a storage maintenance operation on only file blocks included in files identified by the group membership information, subsequent to the storing the first and second plurality of file blocks contiguously.

10. The computer readable storage medium of claim 9 wherein the instructions operable to implement the identifying further comprise instructions for at least one of:
placing the first and second computer system files in a directory; and
executing a command designating the first and second computer system files as belonging to a group.

11. The computer readable storage medium of claim 9 wherein the instructions operable to implement the storing the first and second plurality of file blocks contiguously further comprise instructions for:
storing all of the second plurality of file blocks after the first plurality of file blocks in a sequence on the at least one of the storage device and a second storage device.

12. The computer readable storage medium of claim 9 wherein the instructions operable to implement the storing the first and second plurality of file blocks contiguously further comprise instructions for:
interleaving the first and second plurality of file blocks in a sequence on the at least one of the storage device and a second storage device.

13. The computer readable storage medium of claim 9 wherein the instructions operable to implement the storing group membership information further comprise instructions for:
storing group membership information for the first and second computer system files in a group file contiguously located with the contiguously stored first and second plurality of file blocks.

14. The computer readable storage medium of claim 9 wherein the instructions operable to implement the storing group membership information further comprise instructions for:
storing group membership information for the first and second computer system files in a group file non-contiguously located with the contiguously stored first and second plurality of file blocks.

15. The computer readable storage medium of claim 9 wherein the instructions operable to implement the storing group membership information further comprise instructions for:
storing first group membership information in a first inode corresponding to the first computer system file; and
storing second group membership information in a second inode corresponding to the second computer system file.

16. The computer readable storage medium of claim 9 wherein the first and second computer system files appear to a user as being in different locations in a computer filesystem.

17. An apparatus comprising:
a means for identifying a first computer system file and a second computer system file, wherein the first computer system file comprises a first plurality of file blocks, the second computer system file comprises a second plurality of file blocks, the first and second computer system files are functionally related, and the first and second computer system files are non-contiguously located on a storage device;
a means for reading the first and second plurality of file blocks;
a means for storing the first and second plurality of file blocks contiguously in at least one of the storage device and a second storage device;
a means for storing group membership information for the first and second computer system files in at least one of a group file and an inode; and
a means for performing a storage maintenance operation on only file blocks included in files identified by the group membership information, subsequent to the storing the first and second plurality of file blocks contiguously.

18. The apparatus of claim 17 wherein the means for identifying further comprises at least one of:
a means for placing the first and second computer system files in a directory; and
a means for executing a command designating the first and second computer system files as belonging to a group.

19. The apparatus of claim 17 wherein the means for storing the first and second plurality of file blocks contiguously further comprises:
- a means for storing all of the second plurality of file blocks after the first plurality of file blocks in a sequence on the at least one of the storage device and a second storage device.

20. The apparatus of claim 17 wherein the means for storing the first and second plurality of file blocks contiguously further comprises:
- a means for interleaving the first and second plurality of file blocks in a sequence on the at least one of the storage device and a second storage device.

21. The apparatus of claim 17 wherein the means for storing group membership information further comprises at least one of:
- a means for storing group membership information for the first and second computer system files in a group file contiguously located with the contiguously stored first and second plurality of file blocks;
- a means for storing group membership information for the first and second computer system files in a group file non-contiguously located with the contiguously stored first and second plurality of file blocks;
- a means for storing first group membership information in a first inode corresponding to the first computer system file; and
- a means for storing second group membership information in a second inode corresponding to the second computer system file.

* * * * *